United States Patent [19]
Borgen

[11] Patent Number: 6,078,275
[45] Date of Patent: Jun. 20, 2000

[54] THREE PHASE ONE KILO-HERTZ POWER SUPPLY

[75] Inventor: Gary S. Borgen, Camarillo, Calif.

[73] Assignee: The United States of America as represented by the Secretary of the Navy, Washington, D.C.

[21] Appl. No.: 09/111,372

[22] Filed: Jun. 30, 1998

[51] Int. Cl.[7] .................................................. H03M 1/66
[52] U.S. Cl. ............................................................ 341/144
[58] Field of Search .................................... 341/144, 147, 341/152

[56] References Cited

U.S. PATENT DOCUMENTS

5,485,153  1/1996  Park ........................................ 341/144

*Primary Examiner*—Brian Young
*Attorney, Agent, or Firm*—David S. Kalmbaugh

[57] ABSTRACT

A three phase one kilo-hertz power supply which generates a three phase power single having a line to line voltage of 22 VRMS. The power supply is adapted to operate with an input power source of 90 to 264 VRMS having a frequency range of 50 hertz to 1000 hertz. The power supply comprises three electrically programmable read only memories with each memory containing 1024 point, eight bit binary data representations for generating one complete cycle of a sine wave. Addressing is provided by a binary counter which also generates a 1.024 MHz sampling signal for use by three digital-to-analog converters. Each digital-to-analog converter converts the 1024 point, eight bit binary data representations to a sine wave having a frequency of one kilo-hertz resulting in three sine waves which are phase separated by 120 degrees. Each sine wave is amplified and filtered by an anti-aliasing filter which attenuates selected undesirable frequencies from the sine wave eliminating any distortion effects in the sine wave signal caused by digital to analog sampling.

18 Claims, 6 Drawing Sheets

THREE PHASE ONE KILO-HERTZ POWER SUPPLY

BACKGROUND OF THE INVENTION

1. Field of the Invention

The present invention relates generally to power supplies. More specifically, the present invention relates to a three phase one kilo-hertz power supply which provides a three phase 22 VRMS, one kilo-hertz signal to a three phase gyro.

2. Description of the Prior Art

There is currently a need for a power supply to drive a three phase gyro which has a current requirement of up to three amps per phase at a frequency of one kilo-hertz and a line to line voltage of 22 VRMS. There is also a need for the power supply to receive input power at 90 to 264 VRMS within a frequency range from 50 hertz to 1000 hertz.

Commercially available power supplies generally have a requirement that the input power be supplied to the power supply at 60 hertz. In addition, most commercially available 3-phase power supplies operate from a three phase power source.

Motor/generator sets are commercially available to meet the input power requirements of the three phase gyro. In addition, these motor/generator sets are generally compatible with power systems which provide 115 VRMS input power at frequencies between 60 hertz and 1000 hertz. However, these motor/generator sets utilize moving parts which often wear out and fail after time thus making the motor/generator sets very ineffective and unreliable.

Single phase transformers may not be used to generate power for the gyro since single phase transformers do not have frequency translation capabilities.

SUMMARY OF THE INVENTION

The present invention overcomes some of the disadvantages of the prior art including those mentioned above in that it comprises a relatively simple, yet highly effective three phase 1 KHZ power supply which generates a three phase power single having a line to line voltage of 22 VRMS. The power supply constituting the present invention is also adapted to operate with an input power source of 90 VRMS to 264 VRMS having a frequency range of 50 hertz to 1000 hertz.

The power supply comprises three electrically programmable read only memories (EPROMS) with each memory containing 1024 point, eight bit binary data representations for generating one complete cycle of a sine wave. Addressing for the three EPROMS is provided by a binary counter which also generates a 1.024 MHz sampling signal for use by three digital-to-analog converters. Each digital-to-analog converter converts the 1024 point, eight bit binary data representations to a sine wave having a frequency of 1 KHz resulting in three sine waves which are phase separated by 120°.

Each sine wave is amplified and filtered by an anti-aliasing filter which attenuates selected undesirable frequencies from the sine wave eliminating any distortion effects in the sine wave signal caused by digital to analog sampling.

The power source for the electronic components of the power supply includes an autoranging rectifier module, DC to DC converters and voltage regulators which provide ±30.7 VDC, ±15 VDC and ±5 VDC signals to the power supply's electronic components.

DETAILED DESCRIPTION OF THE PREFERRED EMBODIMENT

Figure 1A:
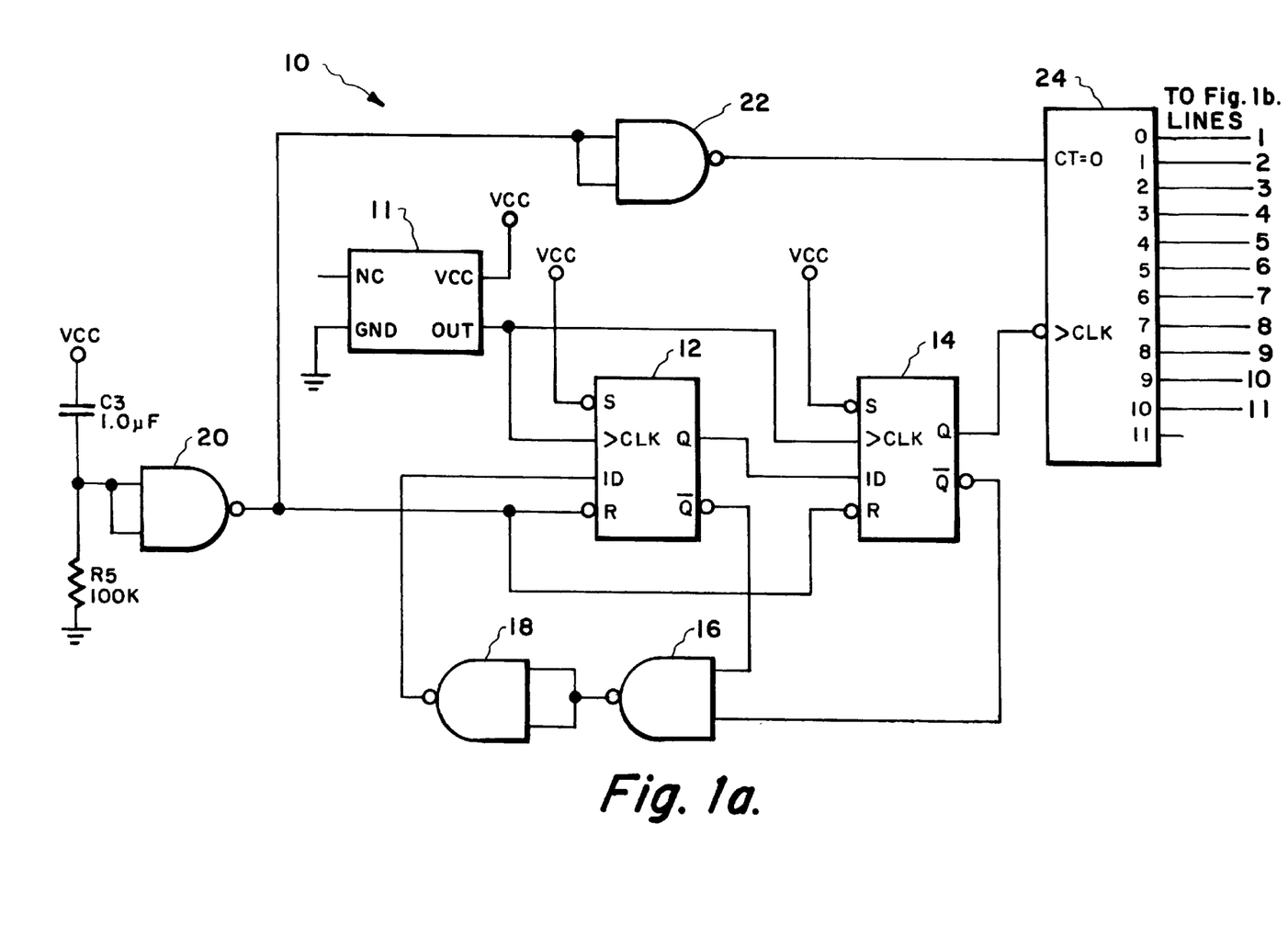
FIGS. 1a–1g are a detailed electrical circuit diagram of the three phase, 1 KHz power supply which constitutes the preferred embodiment of the present invention.
Figure 1B:
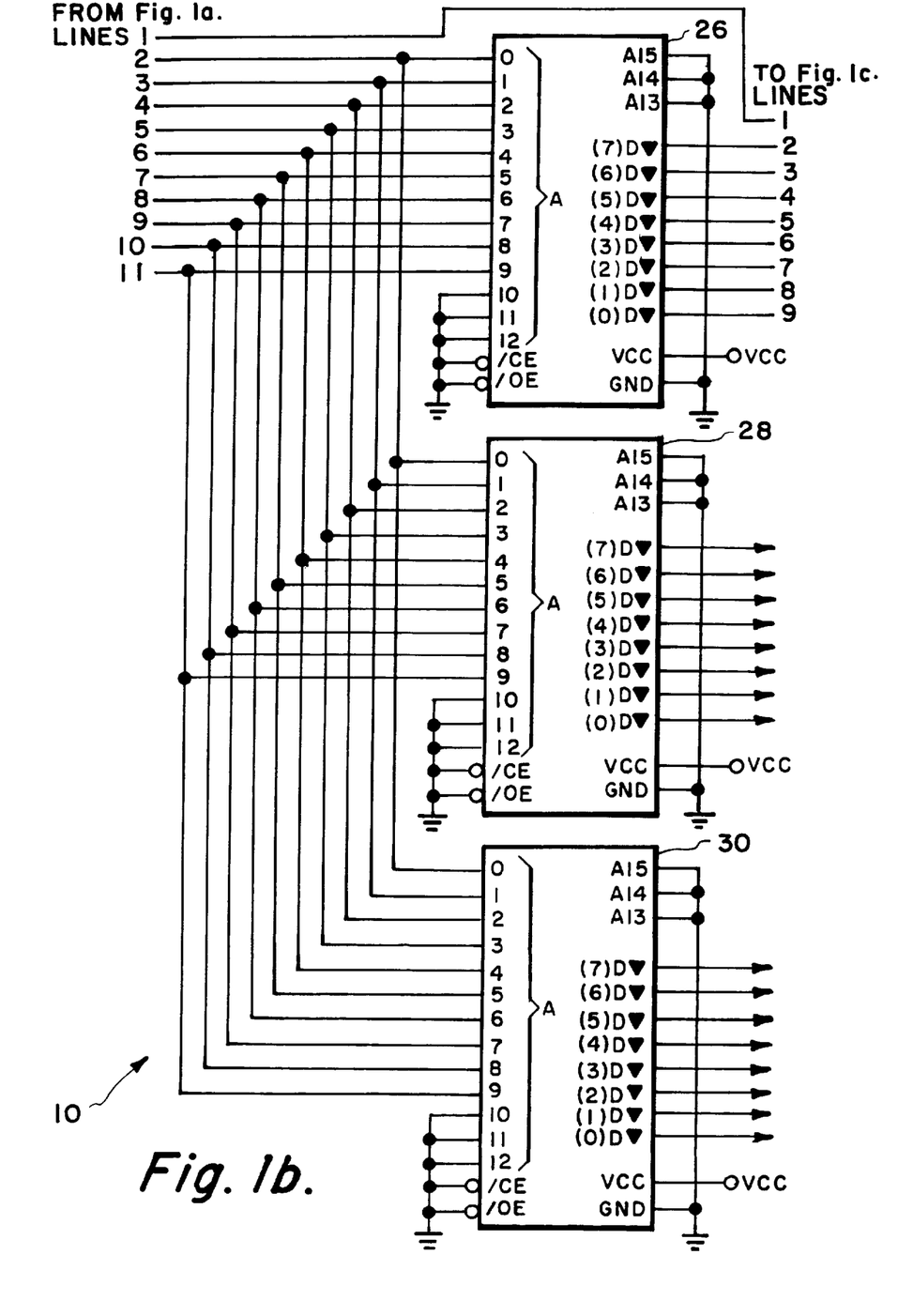
Figure 1C:
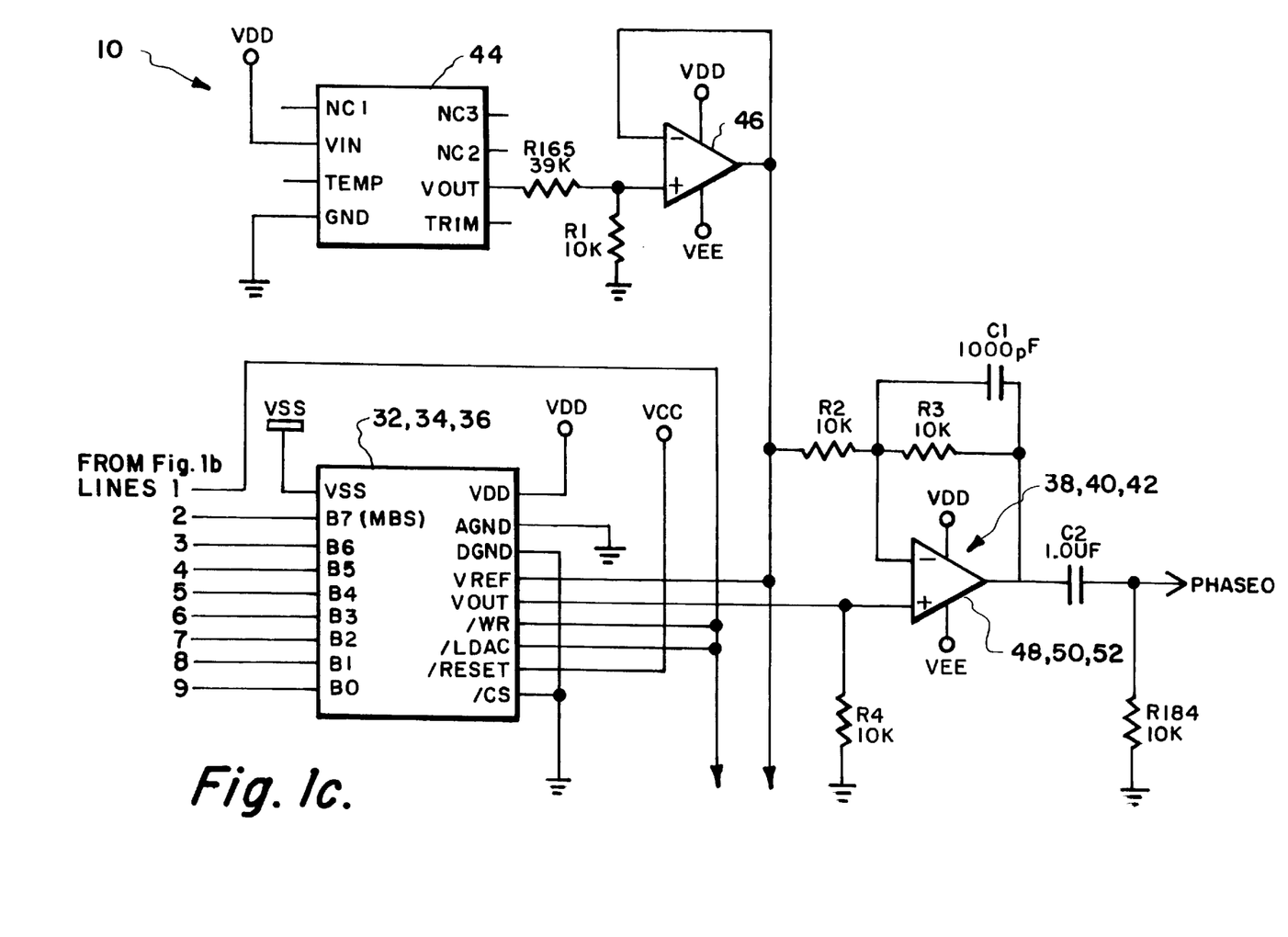
Figure 1D:
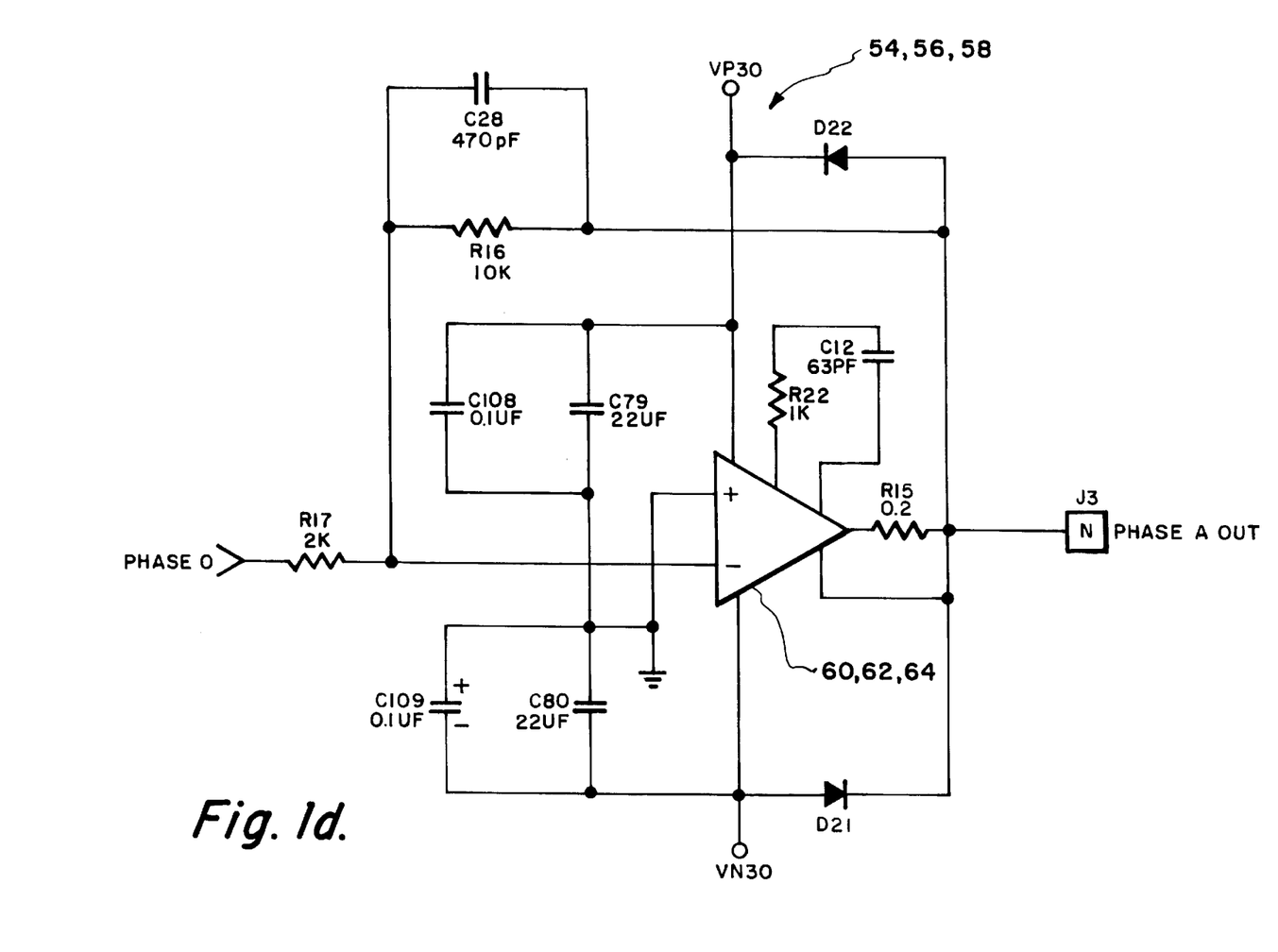
Figure 1E:
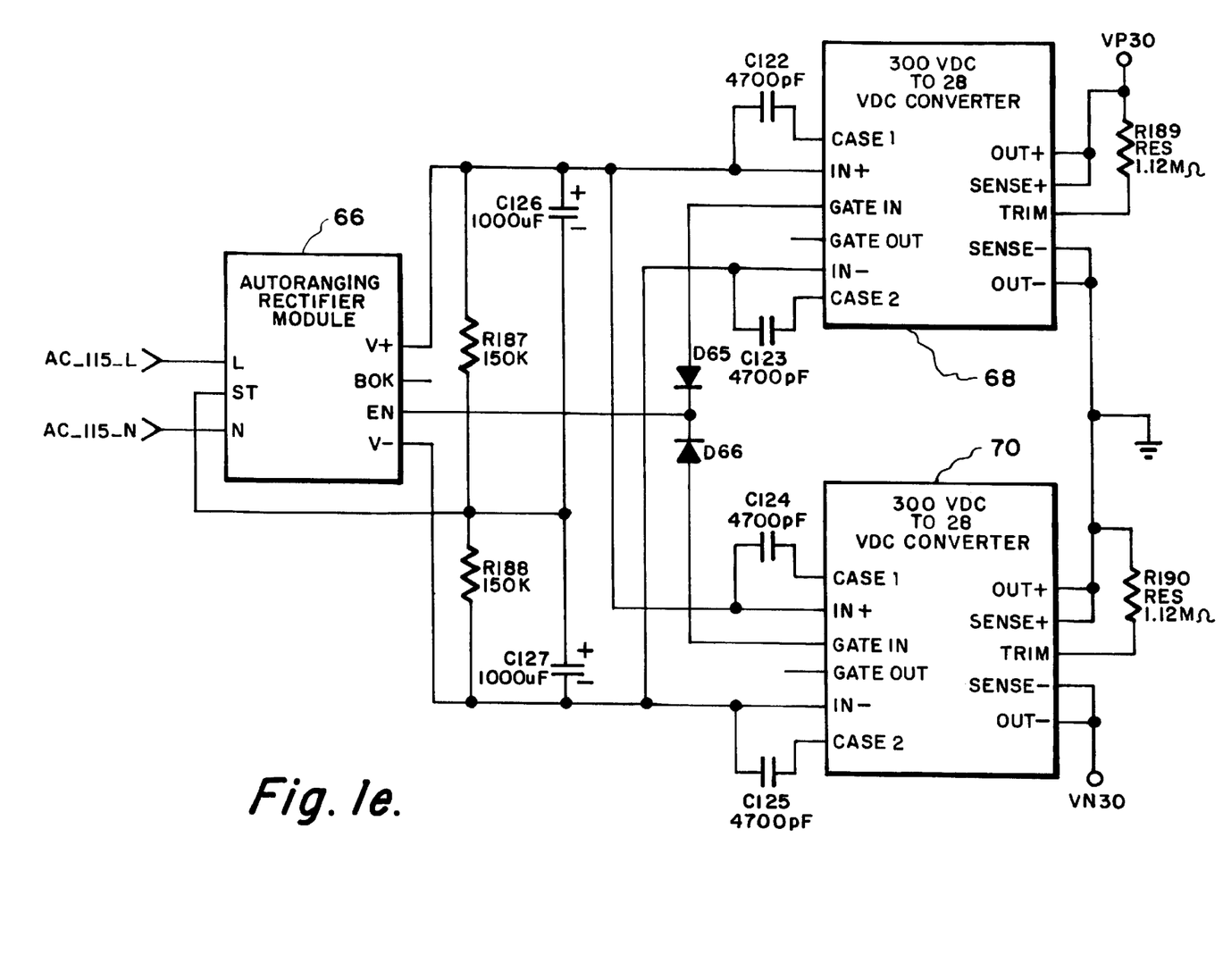
Figure 1F:
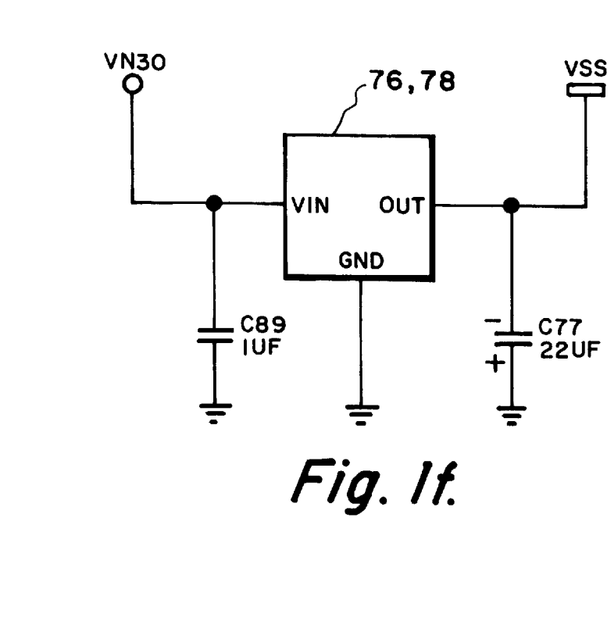
Figure 1G:
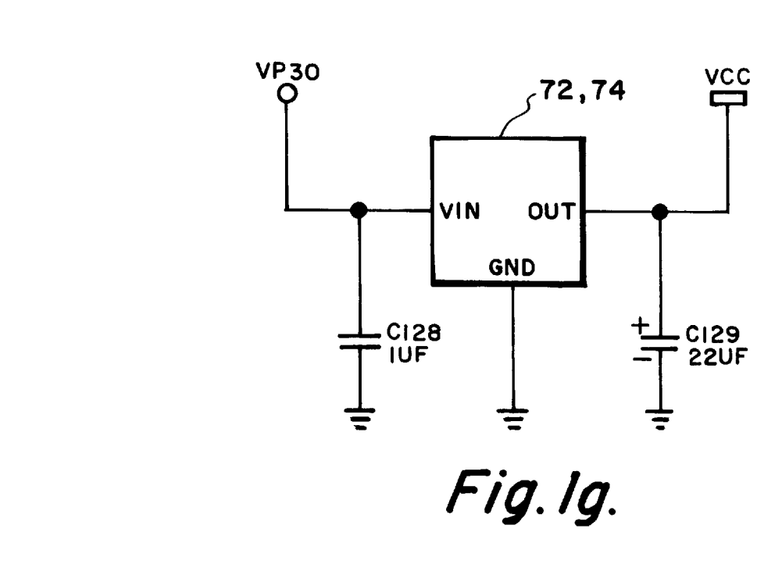

Referring to FIGS. 1a–1g, the three phase, 1 KHz power supply 10 includes an oscillator 11 which provides at its output a 6.144 MHz clock signal. The 6.144 MHz clock signal is supplied to a divide by three logic circuit comprising a pair of D-type Flip-Flops with set/reset function 12 and 14 and a pair of NAND gates 16 and 18. D-type Flip-Flop 14 of the divide by three logic circuit provides at its Q output a 2.048 MHz. The 2.048 MHz clock signal is then supplied to the clock input of a 12 Bit Asynchronous Binary Counter 24.

Counter 24 also receives a reset signal at its clear input from a reset circuit comprising a pair NAND gates 20 and 22, a 100 K-ohm resistor R5 and a 1.0 microfarad capacitor C3. The reset signal resets the Q0–Q11 outputs of counter 24 to the logic zero state when power to power supply 10 is first turned on.

An inverted reset signal is provided at the output of NAND gate 20 and then supplied to the R inputs of Flip-Flops 12 and 14 to set Flip-Flops 12 and 14 to reset Flip-Flops 12 and 14 when power to power supply 10 is first turned on.

The 2.048 MHz clock signal clocks counter 24 which, in turn, provides a WRITE DAC clock signal having a frequency of 1.024 MHz. Counter 24 also provides 10 bit address signals to the address inputs of EPROMS 26, 28 and 30. EPROMS 26, 28 and 30, in response to these 10 bit address signals, generate digital data for a three phase sine wave signal having a frequency of one kilo-hertz.

Appendixes A, B and C are respectively the computer software programs used by EPROMS 26, 28 and 30 to generate the digital data for the three phase sine wave signal. The program Phase0.c is used by EPROM 26 to generate the 0° phase of the signal and has a starting address of 00 Hex. The program Phase120.c is used by EPROM 28 to generate the 120° phase of the signal and has a starting address of 00 Hex. The program Phase240.c is used by EPROM 30 to generate the 240° phase of the signal and has a starting address of 00 Hex.

Each EPROM 26, 28 and 30 generates a complete cycle of a sine wave having 1024 point, 8 bit binary data representations, that is 8 bit data bytes of the sine wave. The 8 bit binary data representations generated by EPROM 26 are supplied to a digital-to-analog converter 32, the 8 bit binary data representations generated by EPROM 28 are supplied to a digital-to-analog converter 34 and the 8 bit binary data representations generated by EPROM 30 are supplied to a digital-to-analog converter 36. The WRITE DAC clock signal then latches these eight bit binary data representations into digital-to-analog converters 32, 34 and 36 at a frequency of 1.024 MHz which then converts them to sine wave signals with each signal having a frequency of one kilo-hertz.

It should be noted that incrementing EPROMS 26, 28 and 30 at the frequency of 1.024 MHz provides the 1 KHz sine wave signal at the output of each digital-to-analog converter 32, 34 and 36.

The one kilo-hertz 0° phase sine wave signal is supplied to an amplifier circuit 38 which multiplies the signal by a factor of two, that is amplifier circuit 38 has a gain of two. Similarly, the one kilo-hertz 120° phase sine wave signal is supplied to an amplifier circuit 40 which multiplies the signal by a factor two. In a like manner, the one kilo-hertz 240° phase sine wave signal is supplied to an amplifier circuit 42 which multiplies the signal by a factor two. Each of the amplifier circuits 38, 40 and 42 also provide a DC offset for the sine wave signal being amplified by the circuit 38, 40 or 42.

Circuit 10 also includes a voltage source 44 which provides at its VOUT output +5VDC which is then supplied to a buffer amplifier 46. Buffer amplifier 46 provides a reference voltage of 3.59 VDC for digital-to-analog converters 32, 34 and 36 as well as operational amplifiers 48, 50 and 52.

At this time it should be noted that the EPROMS 26, 28 and 30 used in the preferred embodiment of the present invention are each a Model 27C512 electrically Programmable Read Only Memory (EPROM) commercially available from Microchip Technology Inc. of Chandler, Ariz. Further, the Digital-to-Analog Converters 32, 34 and 36 are each LC2MOS 8-bit DAC with Output Amplifiers, Model AD7224, commercially available from Analog Devices of Norwood, Mass. The 12 Bit Asynchronous Binary Counter 24 is a Model 74HC4040 commercially available from Texas Instruments of Dallas Texas and several other companies that manufacture High-Speed CMOS Logic circuits. Operational amplifiers 48, 50 and 52 are Model OP27 operational amplifiers commercially available from Analog Devices. Voltage source 44 is a Model REF-02 is a +5V Precision Voltage Reference/Temperature Transducer also commercially available from Analog Devices.

The one kilo-hertz 0° phase sine signal is next supplied to a power amplifier circuit 54 which multiplies the signal by a factor of five, that is amplifier circuit 54 has a gain of five. Power amplifier circuit 54 also phase stabilizes by using a 1 k-ohm resister R22 and a 63 pf capacitor C12. Further, power amplifier circuit 54 functions as a current limiting circuit by using a 0.2 ohm resistor R2 connected to the output of operational amplifier 60. Resistor R2 limits the output current to approximately 2.5 amps.

Power amplifier circuits 56 and 58 operate in an identical manner to power amplifier circuit 54 and thus the operation of each of these power amplifier circuits will not be discussed in detail.

Three phase, 1 KHz power supply 10 also includes three anti-aliasing filters for attenuating selected undesirable frequencies from the sine wave signals output by digital-to-analog converters 32, 34 and 36 to eliminate distortion effects in these sine wave signals caused by digital to analog sampling by converters 32,34 and 36. Amplifier circuits 38, 40 and 42 are each the first stage of an anti-aliasing filter, while power amplifier circuits 54, 56 and 58 are each the associated second stage of the anti-aliasing filter. The first stage of each anti-aliasing filter is a single pole filter set to a frequency of approximately 16 KHz (15.9 KHz actual), which attenuates until unity gain is reached. The associated second stage of each anti-aliasing filter is a single pole filter set to a frequency of approximately 34 KHz (33.8 KHz actual).

The power source for 1 KHz power supply 10 comprises an autoranging rectifier module 66 which receives external 90 VRMS to 264 VRMS, 60 to 1000 hertz input power, converts it to a nominal 320 VDC and then supplies the 320 VDC to a pair of identical DC to DC converters 68 and 70. DC to DC converter 68 generates an isolated plus 30.7 VDC, while DC to DC converter 70 generates an isolated minus 30.7 VDC. Resistors 189 and 190 are 1.12 m-ohm resistors which set the output voltage of converters 68 and 70 to 30.7 volts.

The plus 30.7 VDC signal from converter 68 is supplied to a voltage regulator 72 which generates +5 VDC for circuit 10 and voltage regulator 74 which generates +15 VDC. The minus 30.7 VDC from converter 70 is supplied to a voltage regulator 76 which generates −5 VDC for circuit 10 and voltage regulator 78 which generates −15 VDC for circuit 10.

Operational amplifier 60, 62 and 64 are Model PA45 Power Operational Amplifier commercially available from Apex Microtechnology Corporation of Tuscon, Ariz. Autoranging Rectifier Module 66 is a Model VI-ARM Autoranging Rectifier Module manufactured by Vicor Corporation of Santa Clara, Calif. DC to DC converters are Model VI-200 DC-DC Converters also commercially available from Vicor Corporation.

From the foregoing, it may readily be seen that the present invention comprises a new, unique and exceedingly useful three phase, one kilo-hertz power supply for use with a three phase gyro which constitutes a considerable improvement over the known prior art. Many modifications and variations of the present invention are possible in light of the above teachings. It is to be understood that within the scope of the appended claims the invention may be practiced otherwise than as specifically described.

APPENDIX A

```
#include <stdio.h>
#include <math.h>
/*                Phase0.c                    */
main (.)
{
    double in;
    double out;
    int i;
    int r;
    int samples;
    int range;
    unsigned char MT;
    printf ("\2$A0000,");    /* Start address */
    samples = 1024;
    range = 256;
    for (i = 0; i < samples; i++)
        {
        in = 2 * i * 3.14159256 / samples;
        out = ( range * sin(in) / 2 ) + ( range / 2 );
        r = out;
        MT = r;
        if ( r >= 16 )      /* format data for correct ASCII
               Hex output */
               {            /* greater than 16 */
               printf("\n%2X ", MT);
               }
        if ( (r >= 0) && (r < 16) )    /* 0 to 15 */
               {
               printf("\n0%X ", MT);
               }
        }
    printf ("\n$A0400,");    /* Fill Start address */
    for (i = 0; i < samples; i++)
        {
        printf("\n80 ");     /* Fill with mid scale value */
        }
    printf("\3\n$S7F81,\n"); /* sum check for Data I/O */
}
```

APPENDIX B

```
#include <stdio.h>
#include <math.h>
/*                Phase120.c                  */
main ()
{
    double in;
    double out;
```

APPENDIX B-continued

```
    int i;
    int r;
    int samples;
    int range;
    unsigned char MT;
    printf ("\2$A0000,");    /* Start address */
    samples = 1024;
    range = 256;
    for (i = 0; i < samples; i++)
        {
        in = 2 * i * 3.14159256 / samples;
        out = ( range * sin(in + (2 * 3.14159256 / 3)) / 2 ) +
            ( range / 2 );
        r = out;
        MT = r;
        if ( r >= 16 )        /* format data for correct ASCII
            Hex output */
            {                 /* greater than 16 */
            printf("\n%2X ", MT);
            }
        if ( (r >= 0) && (r < 16) )    /* 0 to 15 */
            {
            printf("\n0%X ", MT);
            }
        }
    printf("\n$A0400,");          /* Fill Start Address */
    for (i = 0; i < samples; i++)
        {
        printf("\n80 ");      /* Fill with mid scale value */
        }
    printf("\3\n$S7F80,\n"); /* sum check for Data I/O */
}
```

APPENDIX C

```
#include <stdio.h>
#include <math.h>
/*            Phase240.c            */
main ()
{
    double in;
    double out;
    int i;
    int r;
    int samples;
    int range;
    unsigned char MT;
    printf ("\2$A0000,");    /* Start address */
    samples = 1024;
    range = 256;
    for (i = 0; i < samples; i++)
        {
        in = 2 * i * 3.14159256 / samples;
        out = ( range * sin(in + (4 * 3.14159256 / 3)) / 2 ) +
            ( range / 2 );
        r = out;
        MT = r;
        if ( r >= 16 )        /* format data for correct ASCII
            Hex output */
            {                 /* greater than 16 */
            printf("\n%2X ", MT);
            }
        if ( (r >= 0) && (r < 16) )    /* 0 to 15 */
            {
            printf("\n0%X ", MT);
            }
        }
    printf ("\n$A0400,");        /* Fill Start address */
    for (i = 0; i < samples; i++)
        {
        printf("\n80 ");    /* Fill with mid scale value */
        }
    printf("\3\n$S7F80,\n"); /* sum check for Data I/O */
}
```

What is claimed is:

1. A three phase power supply for use in powering a three phase gyro comprising:

clock signal generating means for generating a system clock signal;

counter means for receiving said system clock signal, said counter means, responsive to said system clock signal, generating a plurality of addresses and a digital-to-analog conversion clock signal;

memory means for receiving said plurality of addresses, said memory means, responsive to said plurality of addresses, generating a plurality of binary data bytes representative of a three phase sine wave signal having first, second and third phases and a predetermined frequency;

digital-to-analog converter means for receiving said digital-to-analog conversion clock signal and said plurality of binary data bytes, said digital-to-analog converter means, responsive to said digital-to-analog conversion clock signal, converting said plurality of binary data bytes to said three phase sine wave signal; and amplifying means for amplifying said three phase sine wave signal, said amplifying means including filtering means for attenuating selected undesirable frequencies within said three phase sine wave signal to eliminate distortion effects from said three phase sine wave signal.

2. The three phase power supply of claim 1 wherein said clock signal generating means comprises:

an oscillator having an output;

a first Flip-Flop having a clock input connected to the output of said oscillator, a set input, a reset input, a data input, a Q output and a not Q output;

a second Flip-Flop having a clock input connected to the output of said oscillator, a set input, a reset input, a data input connected to the Q output of said first Flip-Flop, a Q output connected to said counter means and a not Q output;

a direct current voltage source having an output connected to the set input of said first Flip-Flop and the set input of said second Flip-Flop;

a reset signal generating circuit having an output connected to the reset input of said first Flip-Flop and the reset input of said second Flip-Flop;

a first NAND gate having a first input connected to the not Q output of said first Flip-Flop, a second input connected to the not Q output of said second Flip-Flop and an output; and a second Flip-Flop having first and second inputs connected to the output of first Flip-Flop and an output connected to the data input of said first Flip-Flop.

3. The three phase power supply of claim 1 wherein said counter means comprises a twelve bit asynchronous binary counter.

4. The three phase power supply of claim 1 wherein said memory means comprises first, second and third electrically programmed read only memories.

5. The three phase power supply of claim 1 wherein said digital-to-analog converter means comprises first, second and third digital-to-analog converters.

6. The three phase power supply of claim 1 wherein said predetermined frequency of said three phase sine wave signal is one kilo-hertz.

7. The three phase power supply of claim 1 wherein each of said plurality of binary data bytes comprises an eight bit binary data byte.

8. The three phase power supply of claim 1 wherein said filter means comprises first, second and third anti-aliasing filters, each of said first, second and third anti-aliasing filters having a first stage and a second stage, the first stage of each of said anti-aliasing filters comprising a single pole filter set to a frequency of approximately 16 kilo-hertz and the second stage of each of said anti-aliasing filters is a single pole filter set to a frequency of approximately 34 kilo-hertz.

9. A three phase power supply for use in powering a three phase gyro comprising:

a clock signal generator for generating a system clock signal;

an asynchronous binary counter connected to said clock signal generator to receive said system clock signal, said asynchronous binary counter, responsive to said clock signal generator, generating a plurality of addresses and a digital-to-analog conversion clock signal;

first, second and third programmed read only memories connected to said asynchronous binary counter to receive said plurality of addresses, said first, second and third programmed read only memories, responsive to said plurality of addresses, generating a plurality of binary data bytes representative of a three phase sine wave signal having first, second and third phases and a predetermined frequency;

first, second and third digital-to-analog converters connected to said asynchronous binary counter to receive said digital-to-analog conversion clock signal, said first, second and third digital-to-analog converters being respectively connected to said first, second and third programmed read only memories to said eight bit binary data bytes, said first, second and third digital-to-analog converters, responsive to said digital-to-analog conversion clock signal, converting said plurality of eight bit binary data bytes to said three phase sine wave signal; and first, second and third two stage amplifiers respectively connected to said first, second and third digital-to-analog converters to receive and then amplify the first, second and third phases of said three phase sine wave signal;

each of said first, second and third two stage amplifiers including a filter for attenuating selected undesirable frequencies within the first, second and third phases of said three phase sine wave signal to eliminate distortion effects from the first, second and third phases of said three phase sine wave signal.

10. The three phase power supply of claim 9 wherein said clock signal generator comprises:

an oscillator having an output;

a first Flip-Flop having a clock input connected to the output of said oscillator, a set input, a reset input, a data input, a Q output and a not Q output;

a second Flip-Flop having a clock input connected to the output of said oscillator, a set input, a reset input, a data input connected to the Q output of said first Flip-Flop, a Q output connected to said asynchronous binary counter and a not Q output;

a direct current voltage source having an output connected to the set input of said first Flip-Flop and the set input of said second Flip-Flop;

a reset signal generating circuit having an output connected to the reset input of said first Flip-Flop and the reset input of said second Flip-Flop;

a first NAND gate having a first input connected to the not Q output of said first Flip-Flop, a second input connected to the not Q output of said second Flip-Flop and an output; and a second Flip-Flop having first and second inputs connected to the output of first Flip-Flop and an output connected to the data input of said first Flip-Flop.

11. The three phase power supply of claim 9 wherein said predetermined frequency of said three phase sine wave signal is one kilo-hertz.

12. The three phase power supply of claim 9 wherein each of said plurality of binary data bytes comprises an eight bit binary data byte.

13. The three phase power supply of claim 9 wherein said filter of each of said first, second and third two stage amplifiers comprises an anti-aliasing filter having a first stage and a second stage, the first stage of said anti-aliasing filter comprising a single pole filter set to a frequency of approximately 16 kilo-hertz and the second stage of said anti-aliasing filter is a single pole filter set to a frequency of approximately 34 kilo-hertz.

14. A three phase power supply for use in powering a three phase gyro comprising:

a clock signal generator for generating a system clock signal;

an asynchronous binary counter connected to said clock signal generator to receive said system clock signal, said asynchronous binary counter, responsive to said clock signal generator, generating a plurality of addresses and a digital-to-analog conversion clock signal;

first, second and third programmed read only memories connected to said asynchronous binary counter to receive said plurality of addresses, said first, second and third programmed read only memories, responsive to said plurality of addresses, generating a plurality of binary data bytes representative of a three phase sine wave signal having first, second and third phases and a predetermined frequency;

first, second and third digital-to-analog converters connected to said asynchronous binary counter to receive said digital-to-analog conversion clock signal, said first, second and third digital-to-analog converters being respectively connected to said first, second and third programmed read only memories to said eight bit binary data bytes, said first, second and third digital-to-analog converters, responsive to said digital-to-analog conversion clock signal, converting said plurality of eight bit binary data bytes to said three phase sine wave signal;

first, second and third two stage amplifiers respectively connected to said first, second and third digital-to-analog converters to receive and then amplify the first, second and third phases of said three phase sine wave signal;

each of said first, second and third two stage amplifiers including a filter for attenuating selected undesirable frequencies within the first, second and third phases of said three phase sine wave signal to eliminate distortion effects from the first, second and third phases of said three phase sine wave signal; and a power supply connected to said clock signal generator, said asynchronous binary counter, said first, second and third programmed read only memories, said first, second and third digital-to-analog converters and said first, second and third two stage amplifiers;

said power supply receiving an externally generated power signal having a voltage within a voltage range of 90 Volts RMS to 264 Volts RMS and a frequency within a frequency range of 50 hertz to 1000 hertz;

said power supply converting said externally generated power signal to a plurality of direct current voltage signals;

said power supply providing said plurality of direct current voltage signals to said clock signal generator, said asynchronous binary counter, said first, second and third programmed read only memories, said first, second and third digital-to-analog converters and said first, second and third two stage amplifiers to effect the operation of said clock signal generator, said asynchronous binary counter, said first, second and third programmed read only memories, said first, second and third digital-to-analog converters and said first, second and third two stage amplifiers.

15. The three phase power supply of claim 14 wherein said clock signal generator comprises:

an oscillator having an output;

a first Flip-Flop having a clock input connected to the output of said oscillator, a set input, a reset input, a data input, a Q output and a not Q output;

a second Flip-Flop having a clock input connected to the output of said oscillator, a set input, a reset input, a data input connected to the Q output of said first Flip-Flop, a Q output connected to said asynchronous binary counter and a not Q output;

a direct current voltage source having an output connected to the set input of said first Flip-Flop and the set input of said second Flip-Flop;

a reset signal generating circuit having an output connected to the reset input of said first Flip-Flop and the reset input of said second Flip-Flop;

a first NAND gate having a first input connected to the not Q output of said first Flip-Flop, a second input connected to the not Q output of said second Flip-Flop and an output; and a second Flip-Flop having first and second inputs connected to the output of first Flip-Flop and an output connected to the data input of said first Flip-Flop.

16. The three phase power supply of claim 14 wherein said predetermined frequency of said three phase sine wave signal is one kilo-hertz.

17. The three phase power supply of claim 14 wherein each of said plurality of binary data bytes comprises an eight bit binary data byte.

18. The three phase power supply of claim 14 wherein said filter of each of said first, second and third two stage amplifiers comprises an anti-aliasing filter having a first stage and a second stage, the first stage of said anti-aliasing as filter comprising a single pole filter set to a frequency of approximately 16 kilo-hertz and the second stage of said anti-aliasing filter is a single pole filter set to a frequency of 8 approximately 34 kilo-hertz.

* * * * *